(12) United States Patent
He

(10) Patent No.: US 6,870,881 B1
(45) Date of Patent: Mar. 22, 2005

(54) FEEDFORWARD EQUALIZER FOR DFE BASED DETECTOR

(75) Inventor: Runsheng He, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 646 days.

(21) Appl. No.: 09/644,532

(22) Filed: Aug. 24, 2000

(51) Int. Cl.$^7$ ............................................. H03H 7/30
(52) U.S. Cl. ...................... 375/233; 375/350; 708/323
(58) Field of Search ................................ 375/232, 233, 375/346, 348, 350; 708/319, 322, 323

(56) References Cited

U.S. PATENT DOCUMENTS

| | | | |
|---|---|---|---|
| RE34,206 E | * 3/1993 | Sayar | ......................... 375/293 |
| 5,327,460 A | * 7/1994 | Batruni | ....................... 375/233 |
| 5,345,476 A | 9/1994 | Tsujimoto | |
| 5,513,216 A | 4/1996 | Gadot et al. | |
| 5,561,687 A | * 10/1996 | Turner | ......................... 375/233 |
| 5,604,769 A | 2/1997 | Wang | |
| 5,793,801 A | * 8/1998 | Fertner | ........................ 375/219 |
| 6,115,418 A | * 9/2000 | Raghavan | .................... 375/233 |
| 6,178,198 B1 | * 1/2001 | Samueli et al. | ............. 375/214 |
| 6,252,904 B1 | * 6/2001 | Agazzi et al. | ............... 375/233 |

* cited by examiner

Primary Examiner—Young T. Tse

(57) ABSTRACT

A feedforward equalizer for DFE based detector is provided comprising a digital to analog converter to convert an analog signal to a digital signal. A feedforward equalizer comprises a high-pass filter and is responsive to the input circuit. The high-pass filter has a low cutoff frequency, has a relatively flat response and has high attenuation at low frequencies. A decision feedback equalizer comprises a decision circuit responsive to the feedforward equalizer, and a feedback filter is responsive to the decision circuit. The decision circuit is also responsive to the feedback filter.

70 Claims, 9 Drawing Sheets

FEEDFORWARD EQUALIZER FOR DFE BASED DETECTOR

BACKGROUND OF THE INVENTION

1. Field of the Invention

This invention relates generally to a feedforward equalizer used in conjunction with a decision feedback equalizer in a data communications channel. More particularly the present invention relates to a feedforward equalizer used in conjunction with a decision feedback equalizer for a gigabit Ethernet transceiver.

2. Description of the Related Art

A feedforward equalizer is an extremely useful component of a digital signal processor used to shape and otherwise to filter an input signal so as to obtain an output signal with desired characteristics. Feedforward equalizers may be used in such diverse fields as Ethernet transceivers, read circuits for disk drives, ghost cancellation in broadcast and cable TV transmission, channel equalization for communication in magnetic recording, echo cancellation, estimation/prediction for speech processing, adaptive noise cancellation, etc.

A feedforward equalizer is particularly suited for filtering inter-symbol interference (ISI). To varying degrees, ISI is always present in a data communications system. ISI is the result of the transmission characteristics of the communications channel, i.e., the "channel response," and, generally speaking, causes neighboring data symbols, in a transmission sequence, to spread out and interfere with one another. If the channel response is bad, or severe, ISI becomes a major impediment to having low error rate communications between two data endpoints. In fact, at higher data rates, i.e., frequencies, the affect of ISI is more severe since there is more high frequency attenuation in the transmission channel. Consequently, current efforts to push transmission speeds higher and higher in the local loop environment must effectively contend with ISI effects on a transmitted data signal to be successful.

Generally speaking the ISI can be divided into two components, namely precursor and post cursor ISI. Conventionally a feedforward equalizer (FFE) attempts to remove precursor ISI, and decision feedback equalization (DFE) attempts to remove postcursor ISI. FIG. 1 is illustrative of a conventional feedforward equalizer used in conjunction with decision feedback equalizer in a data communications channel. As shown in FIG. 1, an analog, input signal from a communication channel is converted to a digital signal by analog-to-digital converter 102. The digital signal is processed by FFE 104 and DFE 105 in a conventional manner. DFE 105 comprises decision circuit 108, feedback filter 110 and adder 112. Examples of conventional arrangements are discussed in U.S. Pat. Nos. 5,513,216 and 5,604,769, the contents of each of which are incorporated herein by reference.

However in conventional arrangements the length of the postcursor ISI is rather large, as shown in FIG. 2. To process a signal with a long tail, the feedback filter needs to have a proportionately large number of taps. This results in higher complexity and severe error progation.

SUMMARY OF THE INVENTION

According to a first aspect of the present invention, a signal processing apparatus comprises an input circuit to receive an input signal. A feedforward equalizer comprises a high-pass filter and is responsive to the input circuit. A decision feedback equalizer comprises a decision circuit responsive to the feed forward equalizer and a feedback filter responsive to the decision circuit. The decision circuit is responsive to the feedback filter.

According to a second aspect of the present invention, the high-pass filter has a low cutoff frequency.

According to a third aspect of the present invention, the high-pass filter has a flat response.

According to a fourth aspect of the present invention, the high-pass filter has high attenuation at low frequency.

According to a fifth aspect of the present invention, the high-pass filter has high attenuation at low frequencies.

According to a sixth aspect of the present invention, the high attenuation is at least 20 db.

According to a seventh aspect of the present invention, the high-pass filter comprises a first finite impulse response filter (FIR).

According to an eighth aspect of the present invention, the first FIR filter comprises M taps to filter precursor ISI, one main tap and N taps to filter postcursor ISI.

According to a ninth aspect of the present invention, each tap of the first FIR filter has a corresponding coefficient W as follows:

$$W_0 = \text{unity}$$

$$0 < \sum_{1}^{M} W_{-i} + W_o + \sum_{1}^{n} W_i \ll 1, \text{ and}$$

$$-1 \ll W_1, \ldots W_n \ll 0.$$

According to a tenth aspect of the present invention, the input circuit comprises an analog to digital converter.

According to an eleventh aspect of the present invention, the decision circuit comprises a threshold circuit.

According to a twelfth aspect of the present invention, the decision circuit comprises a Viterbi detector.

According to a thirteenth aspect of the present invention, a first adaptive control circuit is provided to adapt the M taps for filtering precursor ISI and N taps for filtering.

According to a fourteenth aspect of the present invention, each of the N taps comprises a limiter to limit the range of adaptation of the N taps.

According to a fifteenth aspect of the present invention, the first adaptive control circuit is operable only during signal acquisition.

According to a sixteenth aspect of the present invention, the feedback filter comprises a second finite impulse response filter (FIR).

According to a seventeenth aspect of the present invention, a second adaptive control circuit to adapt taps of the second FIR.

According to an eighteenth aspect of the present invention, a signal processing apparatus comprises an input means for receiving an input signal. A feedforward equalizer means is provided for feedforward equalizing by high-pass filtering the input signal received by the input means. A decision feedback equalizer means comprises a decision means for recovering data from an output of the feedforward equalizer means and a feedback filter means for filtering an output of the decision means. The decision means is responsive to the feedback filter means.

According to a nineteenth aspect of the present invention, the feedforward equalizer means has a low cutoff frequency.

According to a twentieth aspect of the present invention, the feedforward equalizer means has a flat response.

According to a twenty-first aspect of the present invention, the feedforward equalizer means has high attenuation at low frequency.

According to a twenty-second aspect of the present invention, the feedforward equalizer means has high attenuation at low frequencies.

According to a twenty-third aspect of the present invention, the feedforward equalizer means shortens a length of postcursor inter-symbol interference.

According to a twenty-fourth aspect of the present invention, the feedforward equalizer means attenuates any DC noise.

According to a twenty-fifth aspect of the present invention, the feedforward equalizer means attenuates baseline wander.

According to a twenty-sixth aspect of the present invention, the high attenuation is at least 20 dB.

According to a twenty-seventh aspect of the present invention, the feedforward equalizer means comprises a first finite impulse response filter (FIR) means for filtering the input signal.

According to a twenty-eighth aspect of the present invention, the first FIR filter means comprises M taps for filtering precursor ISI, one main tap and N taps for filtering postcursor ISI.

According to a twenty-ninth aspect of the present invention, each tap of the first FIR filter means has a corresponding coefficient W as follows:

$$W_0 = \text{unity}$$

$$0 < \sum_{1}^{M} W_{-i} + W_o + \sum_{1}^{n} W_i << 1, \text{ and}$$

$$-1 << W_1, \ldots W_n << 0.$$

According to a thirtieth aspect of the present invention, the input means comprises an analog to digital converter means for converting an analog input signal to a digital signal.

According to a thirty-first aspect of the present invention, the decision means comprises a threshold circuit.

According to a thirty-second aspect of the present invention, the decision means comprises a Viterbi detector.

According to a thirty-third aspect of the present invention, a first adaptive control means is provided for adapting the M taps for filtering precursor ISI and N taps for filtering.

According to a thirty-fourth aspect of the present invention, each of the N taps comprises a limiting means for limiting the range of adaptation of the N taps.

According to a thirty-fifth aspect of the present invention, the first adaptive control means is operable only during signal acquisition.

According to a thirty-sixth aspect of the present invention, the feedback filter means comprises a second finite impulse response filter (FIR) means for filtering the output of the decision means.

According to a thirty-seventh aspect of the present invention, a second adaptive control means is provided for adapting taps of the second FIR means.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings wherein like reference symbols refer to like parts.

DESCRIPTION OF THE PREFERRED EMBODIMENTS

The present invention will now be described with reference with to a feedforward equalizer used in an Ethernet transceiver device. Preferably, the feedforward equalizer is embodied in an Integrated Circuit disposed between a digital interface and an RJ45 analog jack. The Integrated Circuit may be installed inside a PC on the network interface card or the motherboard, or may be installed inside a network switch or router. However, other embodiments include applications in read circuits for disk drives, ghost cancellation in broadcast and cable TV transmission, channel equalization for communication in magnetic recording, echo cancellation, estimation/prediction for speech processing, adaptive noise cancellation, etc. All such embodiments are included within the scope of the appended claims.

Moreover, while the invention will be described with respect to the functional elements of the FFE, the person of ordinary skill in the art will be able to embody such functions in discrete digital or analog circuitry, or as software executed by a general purpose process (CPU) or digital signal processor.

Figure 9:
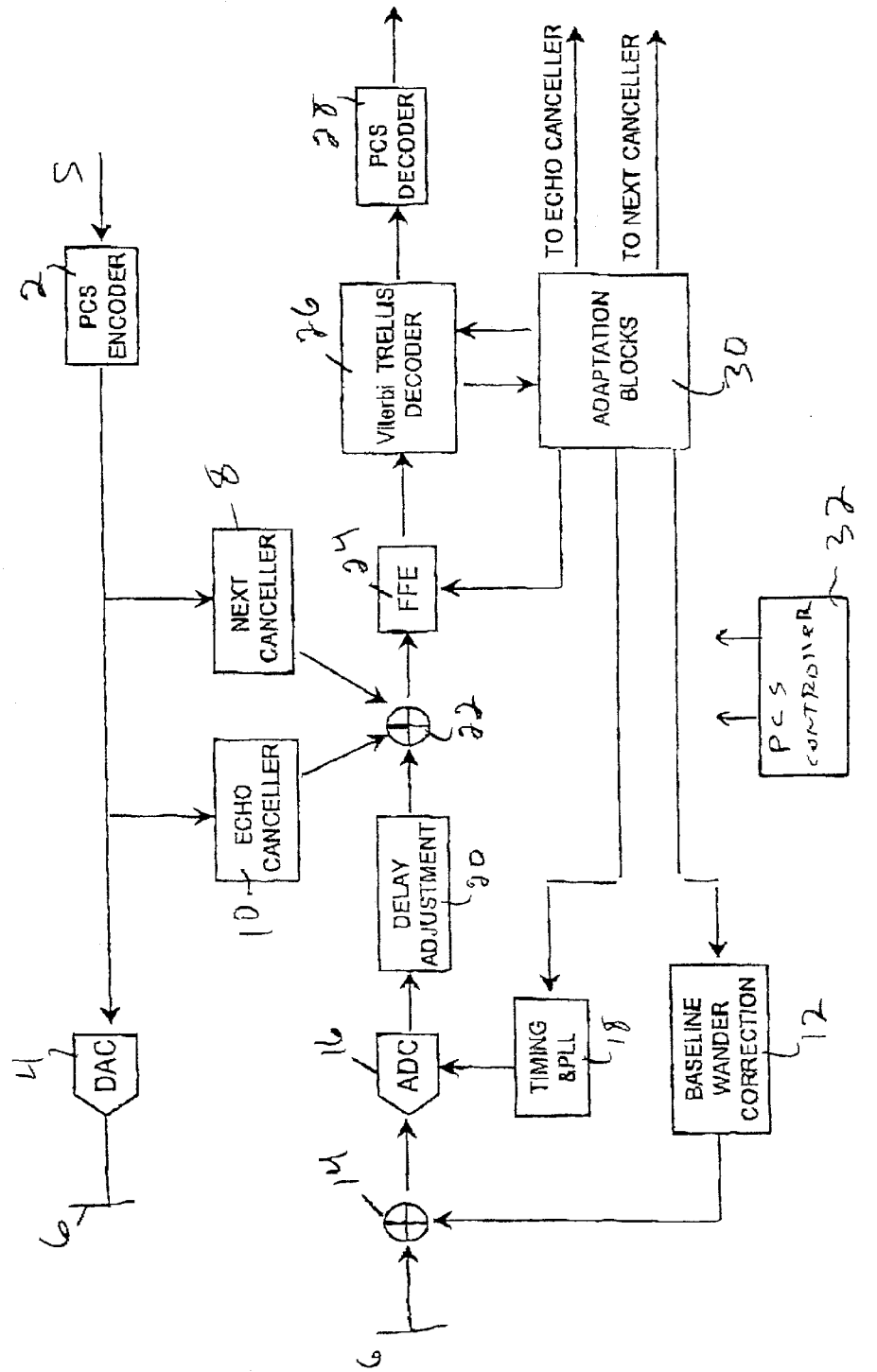
FIG. 9 is a block diagram of an Ethernet transceiver incorporating the feedforward equalizer used in conjunction with a decision feedback equalizer in accordance with the present invention.

A functional block diagram of an Ethernet transceiver incorporating the FFE according to the present invention is depicted in FIG. 9. Although only one channel is depicted therein, four parallel channels are typically used in Gigabit Ethernet applications. Only one channel is depicted and described herein for clarity.

A 125 MHz, 250 Mbps digital input signal from a PC is PCS-encoded in a PCS encoder 2 and is then supplied to a D/A converter 4 for transmission to the Ethernet cable 6. The PCS-encoded signal is also supplied to a NEXT (Near End Transmitter) noise canceller 8 and to adaptive echo canceller 10.

Signals from the Ethernet cable 6 are received at adder 14 and added with correction signals supplied from baseline wander correction block 12 (which corrects for DC offset). The added signals are then converted to digital signals in the A/D converter 16, as controlled by timing and phase-lock-loop block 18. The digital signals from A/D converter 16 are supplied to delay adjustment block 20, which synchronizes the signals in accordance with the four parallel Ethernet channels. The delay-adjusted digital signals are then added with the echo-canceled signals and the NEXT-canceled signals in adder 22.

The added signals are supplied to a Feed Forward Equalizer filter 24 which filters the signal prior to DFE or more specifially, Viterbi trellis decoding in decoder 26. After Viterbi decoding, the output signal is supplied to PCS decoder 28, after which the PCS-decoded signal is supplied to the PC.

The decoder 26 also supplies output signals to a plurality of adaptation blocks schematically depicted at 30 in FIG. 9. As is known, such adaptation blocks carry out corrections for such conditions as temperature offset, connector mismatch, etc. The adaptation block 30 provides output to the baseline wander correction circuit 12, the timing and phase-lock-loop circuit 18, the echo canceller 10, and the NEXT canceller 8. Each functional block depicted in FIG. 9 includes a slave state controller (not shown) for controlling the operation and timing of the corresponding block.

Figure 1:
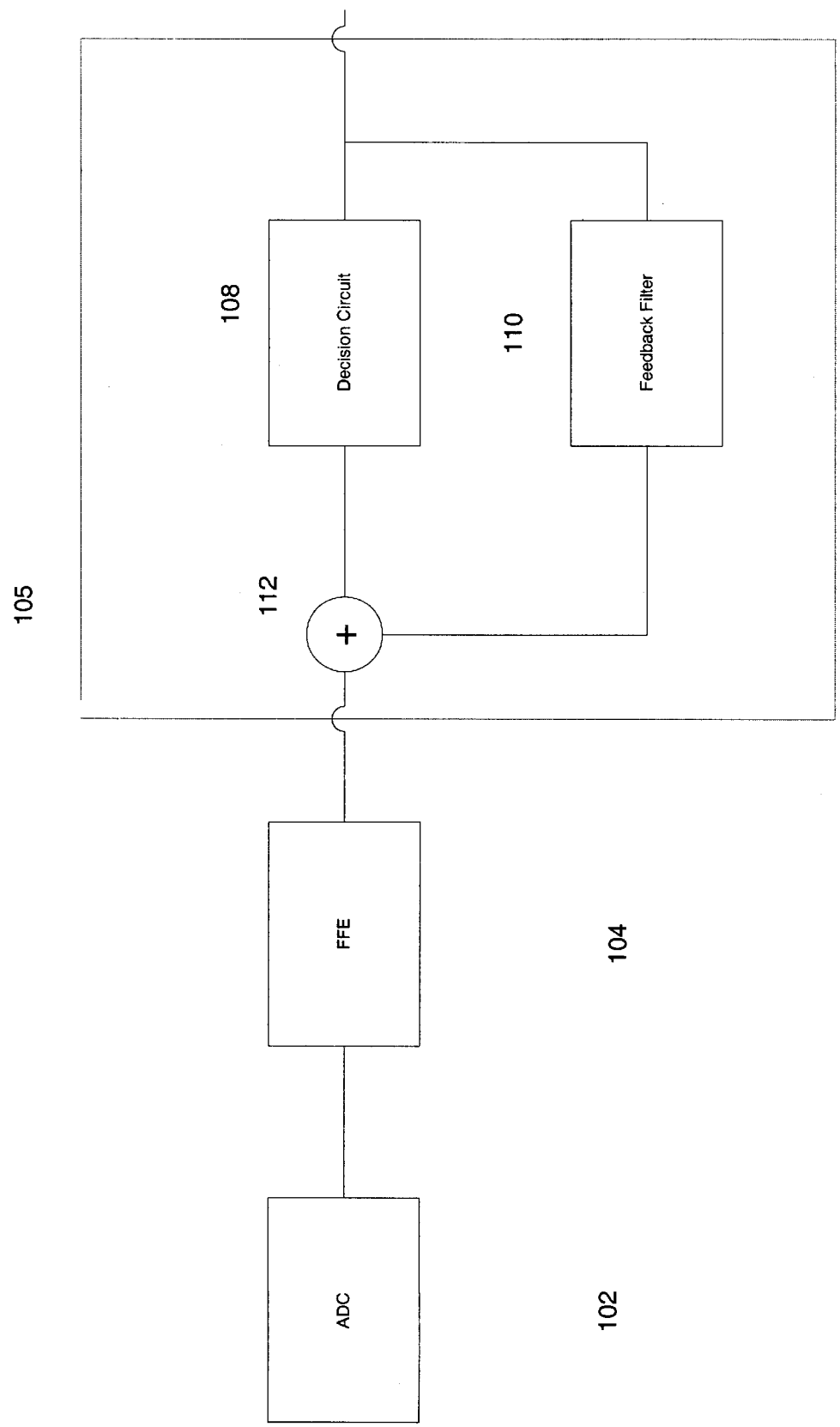
FIG. 1 is a block diagram of a feedforward equalizer used in conjunction with a decision feedback equalizer.
Figure 2:
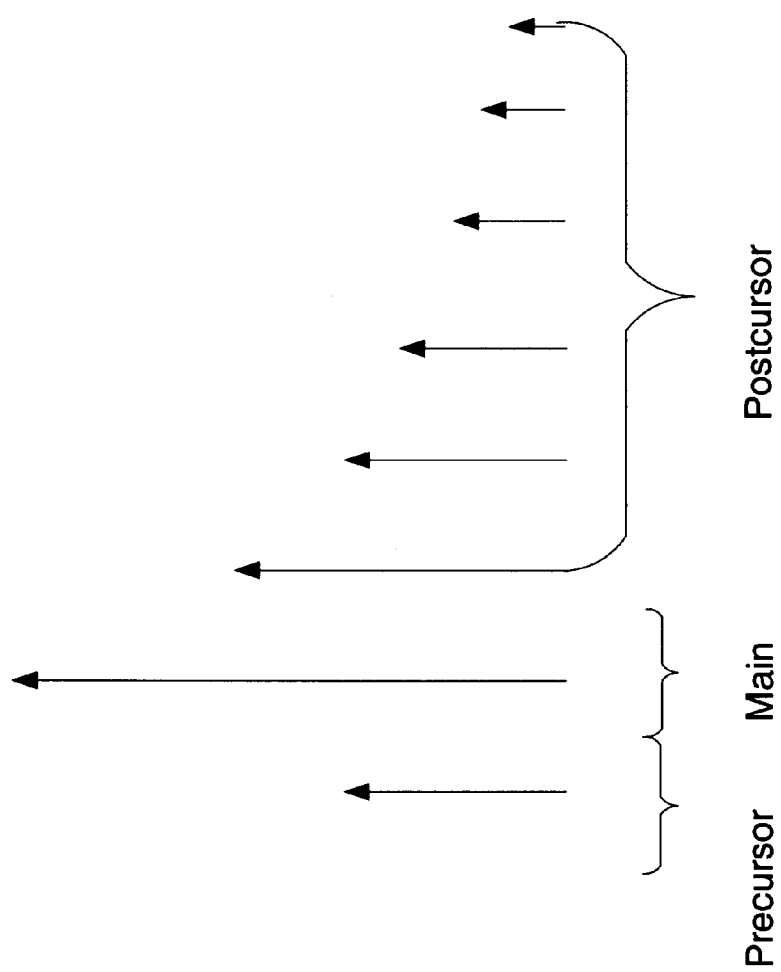
FIG. 2 illustratively shows the length of the postcursor ISI when an input signal is processed by a conventional arrangement.
Figure 3:
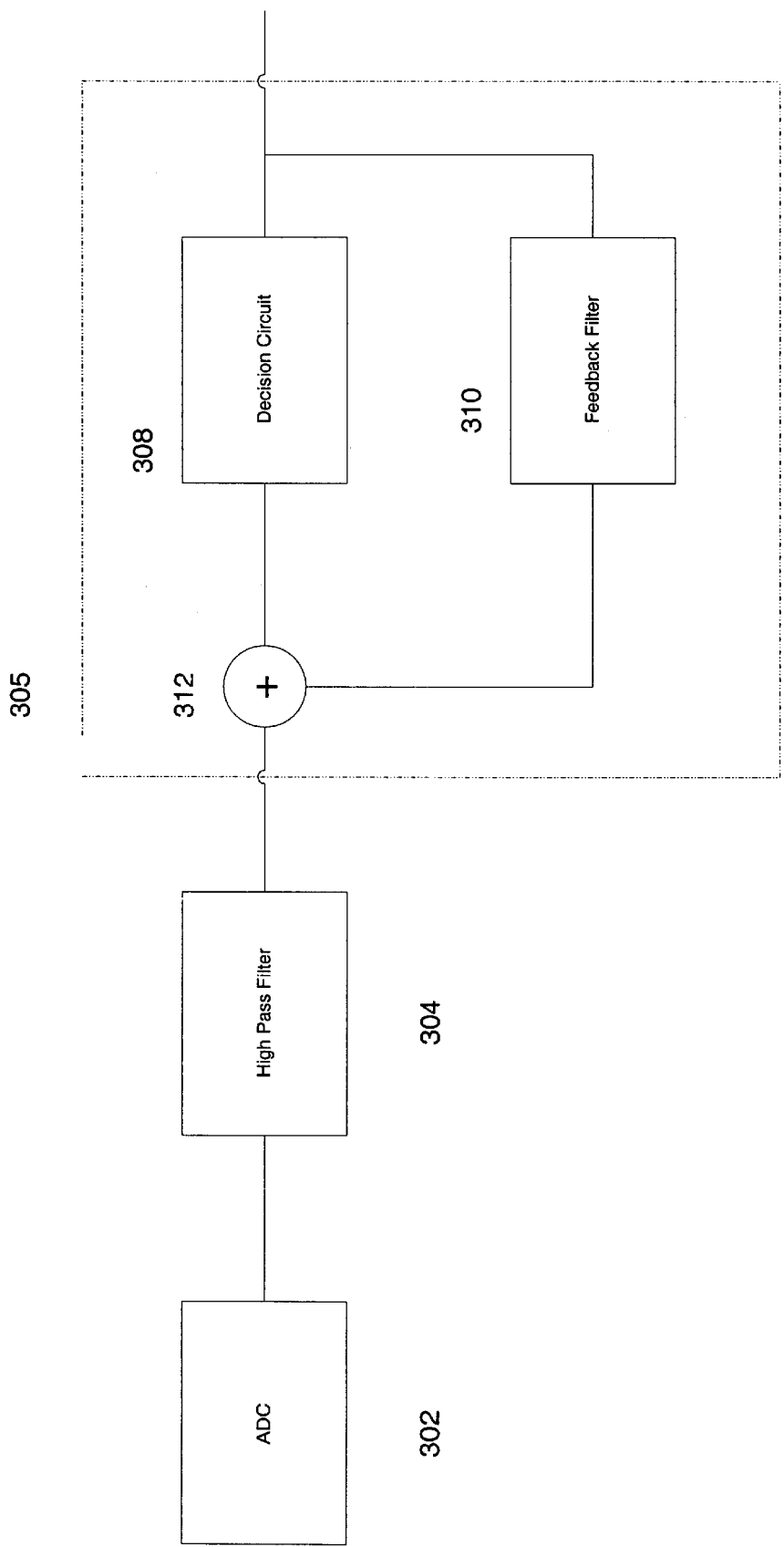
FIG. 3 is a block diagram of a feedforward equalizer implemented as a high-pass filter used in conjunction with a decision feedback equalizer in accordance with a first embodiment of the present invention.
Figure 4:
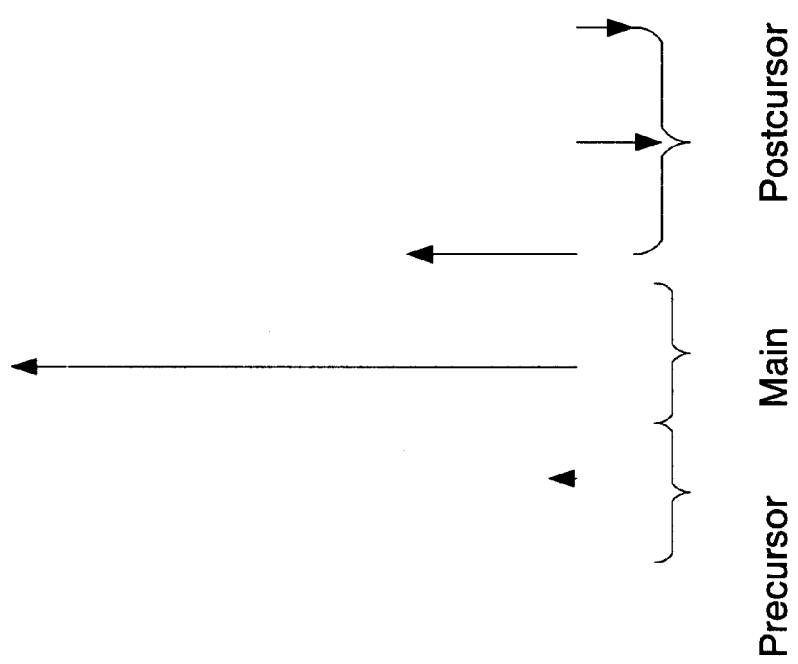
FIG. 4 illustratively shows the length of the postcursor ISI of when an input signal is processed by the present invention.

Reference is now made to FIG. 3 which shows a block diagram of a feedforward equalizer implemented as a high-pass filter used in conjunction with a decision feedback equalizer in accordance with a first embodiment of the present invention. As shown therein, an analog input signal is converted to a digital signal by analog-to-digital converter (ADC) 302. The FFE 304 processes the digitized input signal to effectively cancel the precursor ISI and shorten the length of the postcursor ISI. FIG. 4 illustratively shows the shorten length of the postcursor ISI of when an input signal is processed by FFE 304 of the present invention. FFE 304 is preferably implemented as a high-pass filter to shorten the tail. The output of FFE 304 is then processed by DFE 305 to effectively cancel the postcursor ISI in a known manner. DFE 305 comprises decision circuit 308, feedback filter 310 and adder 312. Decision circuit 308 may be implemented by, for example, a threshold circuit, a Viterbi detector or the like. Feedback filter 310 is preferably implemented as a FIR filter.

Figure 5:
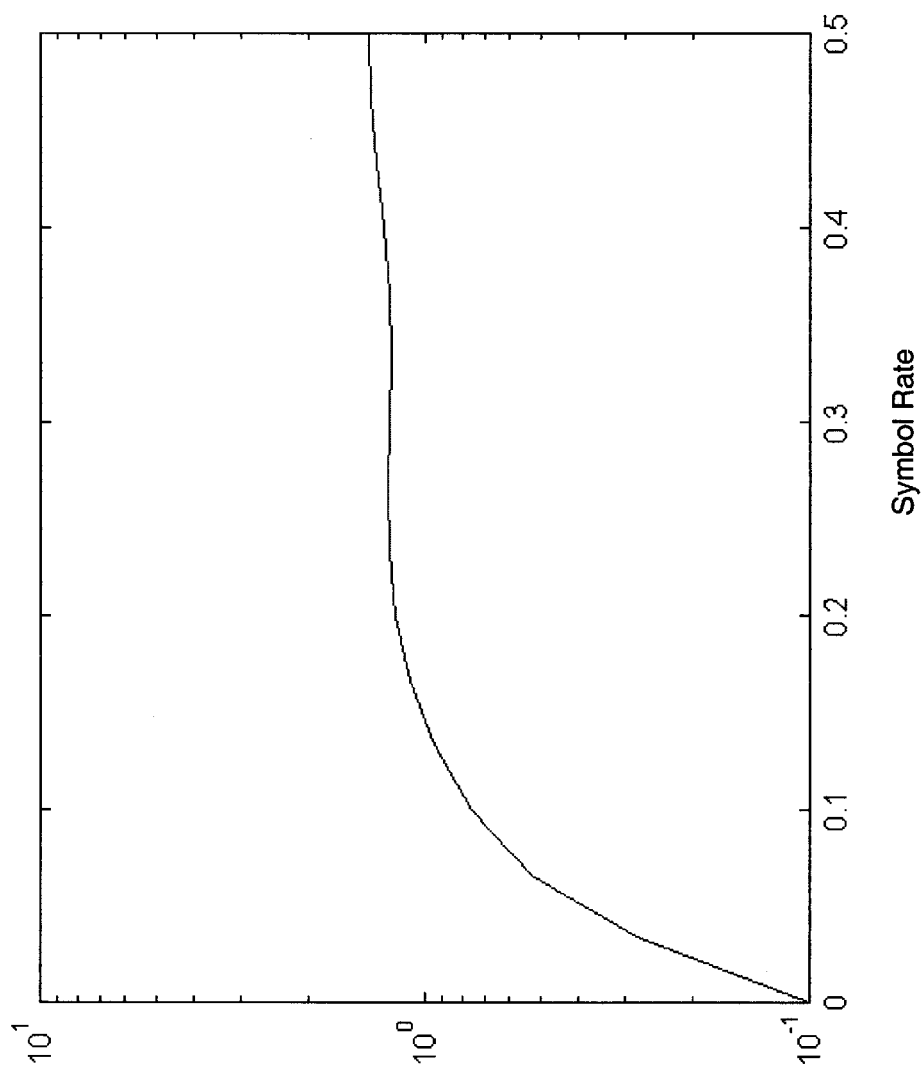
FIG. 5 illustrates the frequency response of the high-pass filter in accordance with FIG. 3.

FIG. 5 illustrates the response characteristics of high-pass filter of FFE 304. The filter has a low cutoff frequency. As can be seen in FIG. 5, at higher frequencies the filter has a relatively flat response and has high attenuation at low frequencies (preferably 20 db). This characteristic is advantageous in attenuating any DC noise and any DC components caused by baseline wander. Significantly, the flat response reduces noise enhancement.

Figure 6:
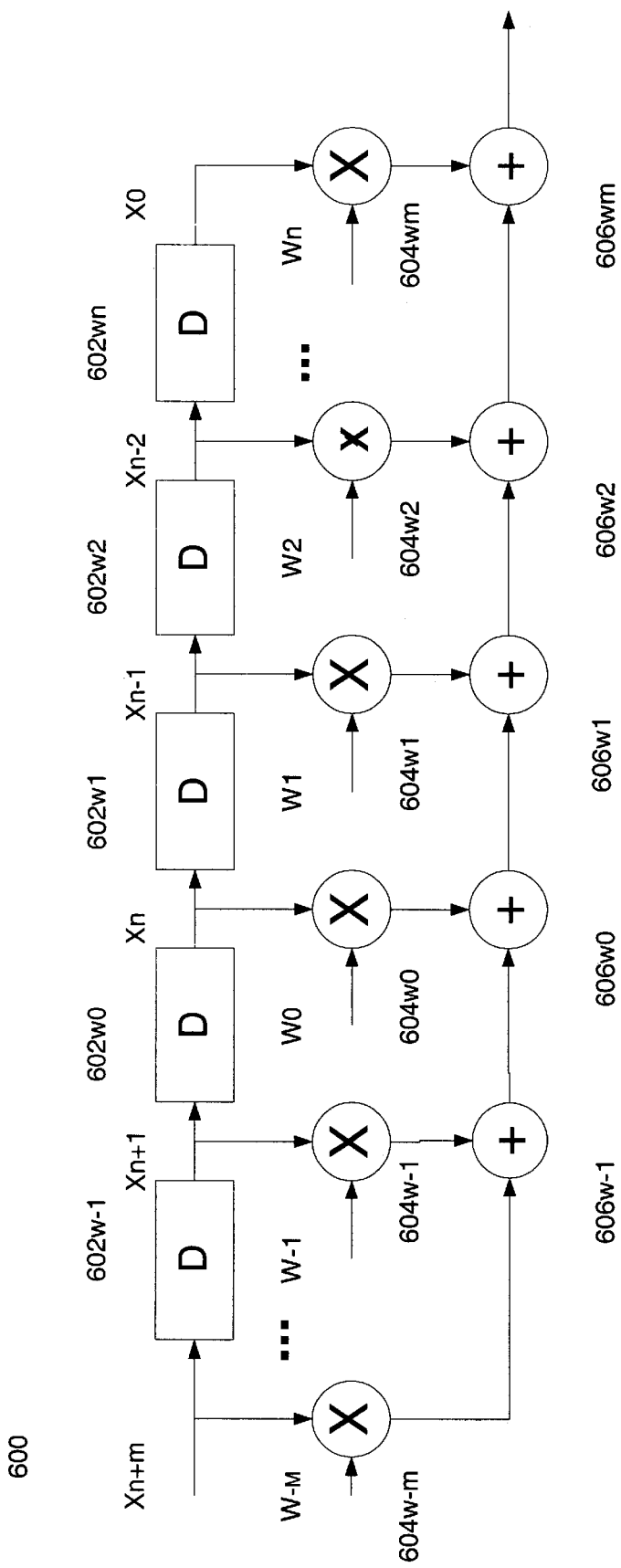
FIG. 6 is a schematic drawing of the high-pass filter of FIG. 3 implemented as an finite impulse response (FIR) filter.

Referring now to FIG. 6, high-pass filter 304 is preferably implemented as a finite impulse response (FIR) filter 600. FIR filter 600 comprises M taps for filtering precursor ISI, one main tap and N taps for filtering postcursor ISI. In the preferred embodiment M=1 and N=3. Each tap comprises a delay 602 (except for the first tap), a multiplier 604 and a summer 606 (except for the first tap). Delay circuit 602 delays an output from a previous tap, and multiplier 604 multiples the output from delay circuit 602 by a coefficient W. The output of multiplier 604 is added to an output from of previous tap by summer 606.

The selection of the coefficients W is critical in providing the response defined in FIG. 5. To achieve this response, the selection of the coefficients W is critical. The appropriate selection of coefficients $W_1 \ldots W_n$ determines the sharpness of the response, and the appropriate selection of coefficients $W_{-m}-W_{-1}$ effectively cancels the precursor tail. In the present embodiment the coefficients are selected from the following constraints:

$$W_0 = \text{unity}$$

$$0 < \sum_1^M W_{-i} + W_o + \sum_1^n W_i << 1$$

$$-1 << W_1, \ldots W_n << 0,$$

in the preferred embodiment $W_0 = 1$ $W_- = -0.1$ $W_{-1}+W_0+W_1+W_2+W_3=0.1$ $|W_1|>|W_2|>|W_3|$ $-1<W_1, W_2, W_3<0$, preferably $W_1=-0.35$, $W_2=-0.25$, and $W_3=-0.20$.

As will be appreciated by one of ordinary skill in the art, the preferred values discussed above may be proportionately varied to still achieve very similar and acceptable responses.

Figure 7:
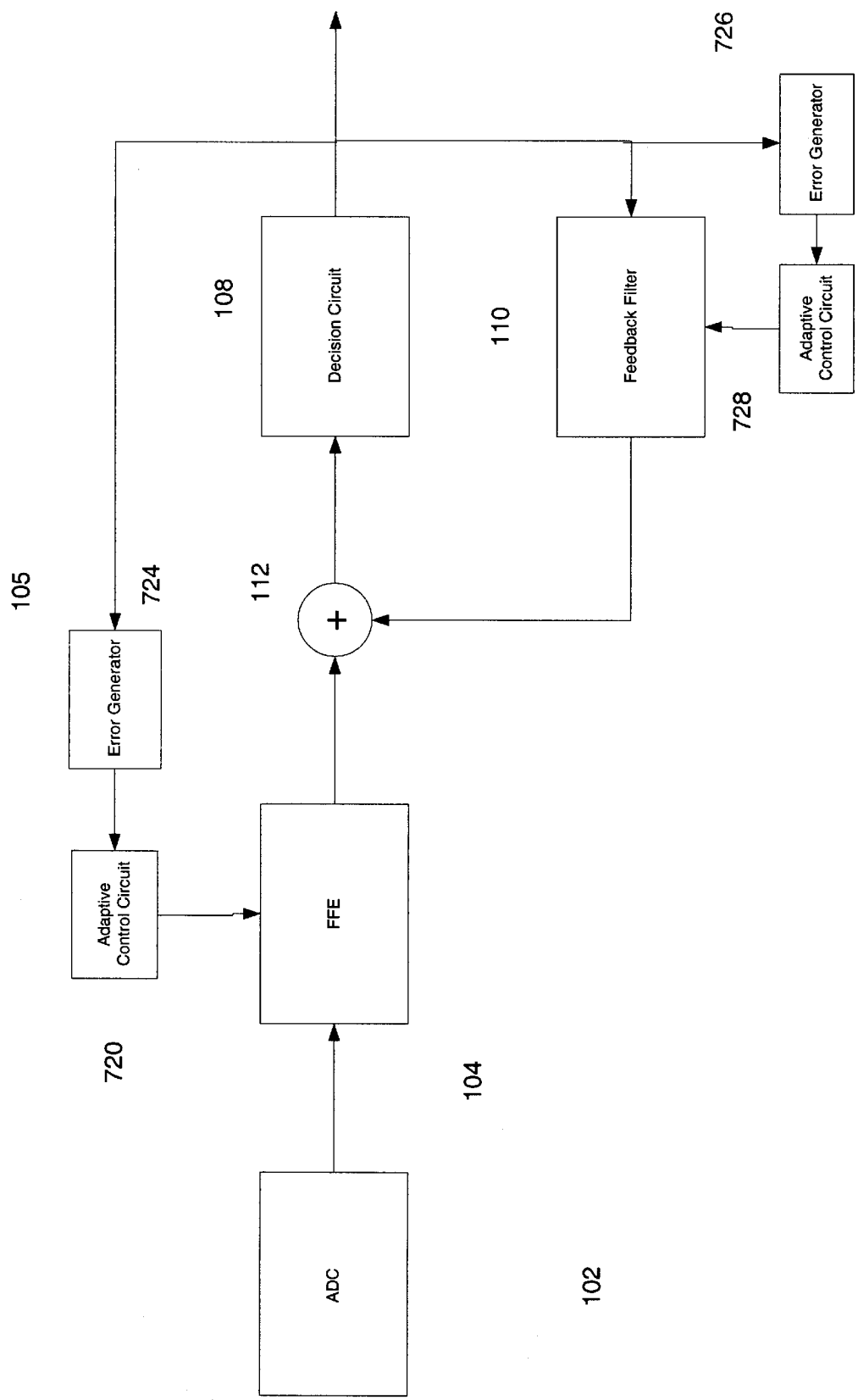
FIG. 7 is a block diagram of a feedforward equalizer implemented as an adaptive high-pass filter used in conjunction with a decision feedback equalizer in accordance with a second embodiment of the present invention.

FIG. 7 is an alternate embodiment of the present invention, in which the coefficients of the FIR of the FFE is adaptive and the FIR of the feedback filter is also adaptive. In general, an error generator circuit 724 is provided to determine any errors during signal acquisition, and an error signal is provided to an adaptive control circuit 720 to move the coefficients of the FFE. These coefficients of the FFE are only moved during signal acquisition. After acquisition, the coefficients of the FFE are then held at the values determined during acquisition. Also, an error generator 726 determines if there are any errors from feedback filter 110 and provides an error signal to adaptive control circuit 728. Adaptive control circuit 728 moves coefficients for feedback filter 110.

Figure 8:
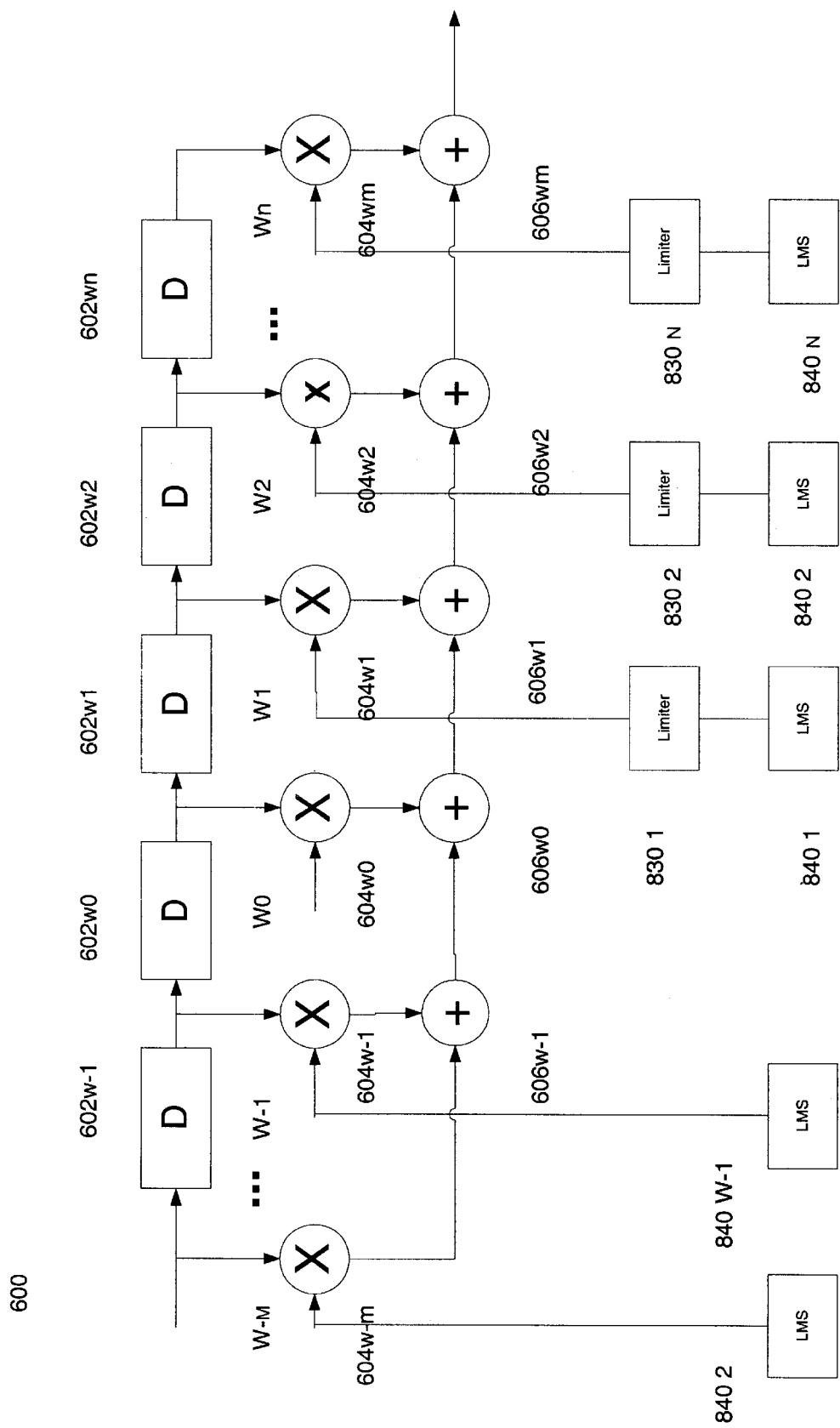
FIG. 8 is a schematic drawing of the high-pass filter of FIG. 7 implemented as an adaptive finite impulse response (FIR) filter.

FIG. 8 shows a more detailed schematic of an adaptive FIR filter for FFE. As shown therein, the main tap $W_0$ is kept at its initial value and is not adapted. Coefficients $W_{-m} \ldots W_{-1}$ can be determined by LMS engines $840_{-m} \ldots 840_{-1}$ in accordance with a least mean square (LMS) algorithm based on gradient optimization. The change in tap weight coefficients $\Delta W_n$ is calculated to be $\Delta W_n = \Delta^* X_n^* E_n$; where $\Delta$ is the adaptation rate and E is the error output by the error generator 724. Coefficients $W_1 \ldots W_n$ are similarly determined by LMS engines $840_1 \ldots 840_n$. In addition to limiters $830_1 \ldots 830_n$ are provided to enforce the constraints discussed above.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. A signal processing apparatus comprising:
   an input circuit to receive an input signal;
   a high-pass filter responsive to said input circuit,
      wherein said high-pass filter comprises M taps to filter precursor intersymbol interference (ISI), one main tap and N taps to filter postcursor ISI, and
      wherein adaptation of each of said N taps is limited to a range of between −1 and 0; and
   a decision feedback equalizer comprising:
      a decision circuit responsive to said high-pass filter; and
      a feedback filter responsive to said decision circuit,
         wherein said decision circuit is responsive to said feedback filter.

2. A signal processing apparatus according to claim 1, wherein said high-pass filter has a low cutoff frequency.

3. A signal processing apparatus according to claim 2, wherein said high-pass filter has a flat response.

4. A signal processing apparatus according to claim 1, wherein said high-pass filter has high attenuation at low frequency.

5. A signal processing apparatus according to claim 1, wherein said high-pass filter has high attenuation at low frequencies.

6. A signal processing apparatus according to claim 5, wherein the high attenuation is at least 20 db.

7. A signal processing apparatus according to claim 1, wherein said input circuit comprises an analog to digital converter.

8. A signal processing apparatus according to claim 1, wherein said decision circuit comprises a threshold circuit.

9. A signal processing apparatus according to claim 1, wherein said decision circuit comprises a Viterbi detector.

10. A signal processing apparatus according to claim 1, wherein said feedback filter comprises a finite impulse response (FIR) filter (FIR).

11. A signal processing apparatus according to claim 10, further comprising an adaptive control circuit to adapt taps of said FIR filter.

12. A signal processing apparatus, comprising:
   an input circuit to receive an input signal;
   a feedforward equalizer comprising a high-pass filter and responsive to said input circuit,
      wherein said high-pass filter comprises a finite impulse response (FIR) filter,
      wherein said FIR filter comprises M taps to filter precursor intersymbol interference (ISI), one main tap and N taps to filter postcursor ISI, and
      wherein adaptation of each of said N taps is limited to a range of between −1 and 0;
   a decision feedback equalizer comprising:
      a decision circuit responsive to said feedforward equalizer; and
      a feedback filter responsive to said decision circuit,
         wherein said decision circuit is responsive to said feedback filter.

13. A signal processing apparatus, comprising:
   an input circuit to receive an input signal;
   a feedforward equalizer comprising a high-pass filter and responsive to said input circuit,
      wherein said high-pass filter comprises a finite impulse response (FIR) filter,
      wherein said FIR filter comprises M taps to filter precursory intersymbol interference (ISI), one main tap and N taps to filter postcursor ISI,
      wherein each tap of said FIR filter has a corresponding coefficient W as follows:

$$W_0 = \text{unity}$$

$$0 < \sum_{1}^{M} W_{-i} + W_o + \sum_{1}^{n} W_i << 1, \text{ and}$$

$$-1 << W_1, \ldots W_n << 0; \text{ and}$$

a decision feedback equalizer comprising:
      a decision circuit responsive to said feedforward equalizer; and
      a feedback filter responsive to said decision circuit,
         wherein said decision circuit is responsive to said feedback filter.

14. A signal processing apparatus, comprising:
   an input circuit to receive an input signal;
   a feedforward equalizer comprising a high-pass filter and responsive to said input circuit,
      wherein said high-pass filter comprises a finite impulse response (FIR) filter, and
      wherein said FIR filter comprises M taps to filter precursor intersymbol interference (ISI), one main tap and N taps to filter postcursor ISI;
   an adaptive control circuit to adapt the M taps for filtering the precursor ISI and N taps for filtering the postcursor ISI; and
   a decision feedback equalizer comprising:
      a decision circuit responsive to said feedforward equalizer; and
      a feedback filter responsive to said decision circuit,
         wherein said decision circuit is responsive to said feedback filter.

15. A signal processing apparatus according to claim 14, wherein each of the N taps comprises a limiter to limit the range of adaptation of the N taps.

16. A signal processing apparatus according to claim 14, wherein said adaptive control circuit is operable only during signal acquisition.

17. A signal processing apparatus comprising:
   input means for receiving an input signal;
   high-pass filtering means for filtering the input signal received by said input means,
      wherein said high-pass filtering means comprises M taps to filter precursor intersymbol interference (ISI), one main tap and N taps to filter postcursor ISI, and
      wherein adaptation of each of said N taps is limited to a range of between −1 and 0; and
   decision feedback equalizer means comprising:
      decision means responsive to said high-pass filtering means for recovering data from an output of said high-pass filtering means; and
      feedback filter means for filtering an output of said decision means,
         wherein said decision means is responsive to said feedback filter means.

18. A signal processing apparatus according to claim 17, wherein said high-pass filtering means has a low cutoff frequency.

19. A signal processing apparatus according to claim 18, wherein said high-pass filtering means has a flat response.

20. A signal processing apparatus according to claim 18, wherein said high-pass filtering means has high attenuation at low frequency.

21. A signal processing apparatus according to claim 17, wherein said high-pass filtering means has high attenuation at low frequencies.

22. A signal processing apparatus according to claim 21, wherein the high attenuation is at least 20 db.

23. A signal processing apparatus according to claim 17, wherein said high-pass filtering means shortens a length of the postcursor ISI.

24. A signal processing apparatus according to claim 17, wherein said high-pass filtering means attenuates DC noise.

25. A signal processing apparatus according to claim 17, wherein said high-pass filtering means attenuates baseline wander.

26. A signal processing apparatus according to claim 17, wherein said input means comprises an analog to digital converter means for converting an analog input signal to a digital signal.

27. A signal processing apparatus according to claim 17, wherein said decision means comprises a threshold circuit.

28. A signal processing apparatus according to claim 17, wherein said decision means comprises a Viterbi detector.

29. A signal processing apparatus according to claim 17, wherein said feedback filter means comprises a finite impulse response (FIR) filter means for filtering the output of said decision means.

30. A signal processing apparatus according to claim 29, further comprising an adaptive control means for adapting taps of said FIR filter means.

31. A signal processing apparatus comprising:
input means for receiving an input signal;
feedforward equalizer means for feedforward equalizing by high-pass filtering the input signal received by said input means,
wherein said feedforward equalizer means comprises a finite impulse response (FIR) filter means for filtering the input signal,
wherein said FIR filter means comprises M taps for filtering precursor intersymbol interference (ISI), one main tap and N taps for filtering postcursor ISI, and
wherein adaptation of each of said N taps is limited to a range of between −1 and 0; and
decision feedback equalizer means comprising:
decision means for recovering data from an output of said feedforward equalizer means; and
feedback filter means for filtering an output of said decision means,
wherein said decision means is responsive to said feedback filter means.

32. A signal processing apparatus, comprising:
input means for receiving an input signal;
feedforward equalizer means for feedforward equalizing by high-pass filtering the input signal received by said input means,
wherein said feedforward equalizer means comprises a finite impulse response (FIR) filter means for filtering the input signal,
wherein said FIR filter means comprises M taps for filtering precursor intersymbol interference (ISI), one main tap and N taps for filtering postcursor ISI,
wherein each tap of said FIR filter means has a corresponding coefficient W as follows:

$$W_0 = \text{unity}$$

$$0 < \sum_1^M W_{-i} + W_o + \sum_1^n W_i << 1, \text{ and}$$

$$-1 << W_1, \ldots W_n << 0; \text{ and}$$

decision feedback equalizer means comprising:
decision means for recovering data from an output of said feedforward equalizer means; and
feedback filter means for filtering an output of said decision means,
wherein said decision means is responsive to said feedback filter means.

33. A signal processing apparatus comprising:
input means for receiving an input signal;
feedforward equalizer means for feedforward equalizing by high-pass filtering the input signal received by said input means,
wherein said feedforward equalizer means comprises a finite impulse response (FIR) filter means for filtering the input signal, and
wherein said FIR filter means comprises M taps for filtering precursor intersymbol interference (ISI), one main tap and N taps for filtering postcursor ISI;
an adaptive control means for adapting the M taps for filtering the precursor ISI and N taps for filtering the postcursor ISI; and
decision feedback equalizer means comprising:
decision means for recovering data from an output of said feedforward equalizer means; and
feedback filter means for filtering an output of said decision means,
wherein said decision means is responsive to said feedback filter means.

34. A signal processing apparatus according to claim 33, wherein each of the N taps comprises a limiting means for limiting the range of adaptation of the N taps.

35. A signal processing apparatus according to claim 33, wherein said adaptive control means is operable only during signal acquisition.

36. An Ethernet transceiver, comprising:
an input circuit for inputting an input signal into an Ethernet cable;
an output circuit for outputting an output signal from the Ethernet cable, the output signal corresponding to the input signal;
a high-pass filter responsive to said input circuit,
wherein said high-pass filter comprises M taps to filter precursor intersymbol interference (ISI), one main tap and N taps to filter postcursor ISI, and
wherein adaptation of each of said N taps is limited to a range of between −1 and 0; and
a decision feedback equalizer comprising:
a decision circuit responsive to said high-pass filter; and
a feedback filter responsive to said decision circuit,
wherein said decision circuit is responsive to said feedback filter.

37. An Ethernet transceiver according to claim 36, wherein said high-pass filter has a low cutoff frequency.

38. An Ethernet transceiver according to claim 37, wherein said high-pass filter has a flat response.

39. An Ethernet transceiver according to claim 36, wherein said high-pass filter has high attenuation at low frequency.

40. An Ethernet transceiver according to claim 36, wherein said high-pass filter has high attenuation at low frequencies.

41. An Ethernet transceiver according to claim 40, wherein the high attenuation is at least 20 db.

42. An Ethernet transceiver according to claim 36, wherein said input circuit comprises an analog to digital converter.

43. An Ethernet transceiver according to claim 36, wherein said decision circuit comprises a threshold circuit.

44. An Ethernet transceiver according to claim 36, wherein said decision circuit comprises a Viterbi detector.

45. An Ethernet transceiver according to claim 36, wherein said feedback filter comprises a finite impulse response (FIR) filter.

46. An Ethernet transceiver according to claim 45, further comprising an adaptive control circuit to adapt taps of said FIR filter.

47. An Ethernet transceiver, comprising:
an input circuit for inputting an input signal into an Ethernet cable;
an output circuit for outputting an output signal from the Ethernet cable, the output signal corresponding to the input signal;
a feedforward equalizer comprising a high-pass filter and responsive to said input circuit,
wherein said high-pass filter comprises a finite impulse response (FIR) filter,
wherein said FIR filter comprises M taps to filter precursor intersymbol interference (ISI), one main tap and N taps to filter postcursor ISI, and
wherein adaptation of each of said N taps is limited to a range of between −1 and 0; and
a decision feedback equalizer comprising:
a decision circuit responsive to said feedforward equalizer; and
a feedback filter responsive to said decision circuit,
wherein said decision circuit is responsive to said feedback filter.

48. An Ethernet transceiver, comprising:
an input circuit for inputting an input signal into an Ethernet cable;
an output circuit for outputting an output signal from the Ethernet cable, the output signal corresponding to the input signal;
a feedforward equalizer comprising a high-pass filter and responsive to said input circuit,
wherein said high-pass filter comprises a finite impulse response (FIR) filter,
wherein said FIR filter comprises M taps to filter precursor intersymbol interference (ISI), one main tap and N taps to filter postcursor ISI,
wherein each tap of said FIR filter has a corresponding coefficient W as follows:

$$W_0 = \text{unity}$$

$$0 < \sum_{1}^{M} W_{-i} + W_o + \sum_{1}^{n} W_i << 1, \text{ and}$$

$$-1 << W_1, \ldots W_n << 0; \text{ and}$$

a decision feedback equalizer comprising:
a decision circuit responsive to said feedforward equalizer; and
a feedback filter responsive to said decision circuit,
wherein said decision circuit is responsive to said feedback filter.

49. An Ethernet transceiver, comprising:
an input circuit for inputting an input signal into an Ethernet cable;
an output circuit for outputting an output signal from the Ethernet cable, the output signal corresponding to the input signal;
a feedforward equalizer comprising a high-pass filter and responsive to said input circuit,
wherein said high-pass filter comprises a finite impulse response (FIR) filter, and
wherein said FIR filter comprises M taps to filter precursor intersymbol interference (ISI), one main tap and N taps to filter postcursor ISI;
an adaptive control circuit to adapt the M taps for filtering the precursor ISI and N taps for filtering the postcursor ISI; and
a decision feedback equalizer comprising:
a decision circuit responsive to said feedforward equalizer; and
a feedback filter responsive to said decision circuit,
wherein said decision circuit is responsive to said feedback filter.

50. An Ethernet transceiver according to claim 49, wherein each of the N taps comprises a limiter to limit the range of adaptation of the N taps.

51. An Ethernet transceiver according to claim 49, wherein said adaptive control circuit is operable only during signal acquisition.

52. An Ethernet transceiver, comprising:
input means for receiving an input signal;
high-pass filtering means for filtering the input signal received by said input means,
wherein said high-pass filtering means comprises M taps to filter precursor intersymbol interference (ISI), one main tap and N taps to filter postcursor ISI, and
wherein adaptation of each of said N taps is limited to a range of between −1 and 0; and
decision feedback equalizer means comprising:
decision means responsive to said high-pass filtering means for recovering data from an output of said high-pass filtering means; and
feedback filter means for filtering an output of said decision means,
wherein said decision means is responsive to said feedback filter means.

53. An Ethernet transceiver according to claim 52, wherein said high-pass filtering means has a low cutoff frequency.

54. An Ethernet transceiver according to claim 53, wherein said high-pass filtering means has a flat response.

55. An Ethernet transceiver according to claim 52, wherein said high-pass filtering means has high attenuation at low frequency.

56. An Ethernet transceiver according to claim 52, wherein said high-pass filtering means has high attenuation at low frequencies.

57. An Ethernet transceiver according to claim 56, wherein the high attenuation is at least 20 db.

58. An Ethernet transceiver according to claim 52, wherein said high-pass filtering means shortens a length of the postcursor ISI.

59. An Ethernet transceiver according to claim 52, wherein said high-pass filtering means attenuates DC noise.

60. An Ethernet transceiver according to claim 52, wherein said high-pass filtering means attenuates baseline wander.

61. An Ethernet transceiver according to claim 52, wherein said input means comprises an analog to digital converter means for converting an analog input signal to a digital signal.

62. An Ethernet transceiver according to claim 52, wherein said decision means comprises a threshold circuit.

63. An Ethernet transceiver according to claim 52, wherein said decision means comprises a Viterbi detector.

64. An Ethernet transceiver according to claim 52, wherein said feedback filter means comprises a finite impulse response (FIR) filter means for filtering the output of said decision means.

65. An Ethernet transceiver according to claim 64, further comprising an adaptive control means for adapting taps of said FIR filter means.

66. An Ethernet transceiver, comprising:
input means for receiving an input signal;
feedforward equalizer means for feedforward equalizing by high-pass filtering the input signal received by said input means, wherein said feedforward equalizer means comprises a finite impulse response (FIR) filter means for filtering the input signal, wherein said FIR filter means comprises M taps for filtering precursor intersymbol interference (ISI), one main tap and N taps for filtering postcursor ISI, and wherein adaptation of each of said N taps is limited to a range of between −1 and 0; and decision feedback equalizer means comprising:
  decision means for recovering data from an output of said feedforward equalizer means; and
  feedback filter means for filtering an output of said decision means,
    wherein said decision means is responsive to said feedback filter means.

67. An Ethernet transceiver, comprising:

input means for receiving an input signal;

feedforward equalizer means for feedforward equalizing by high-pass filtering the input signal received by said input means, wherein said feedforward equalizer means comprises a finite impulse response (FIR) filter means for filtering the input signal, wherein said FIR filter means comprises M taps for filtering precursor intersymbol interference (ISI), one main tap and N taps for filtering postcursor ISI, wherein each tap of said FIR filter means has a corresponding coefficient W as follows:

$$W_0 = \text{unity}$$

$$0 < \sum_1^M W_{-i} + W_o + \sum_1^n W_i \ll 1, \text{ and}$$

$$-1 \ll W_1, \ldots W_n \ll 0; \text{ and}$$

decision feedback equalizer means comprising:
  decision means for recovering data from an output of said feedforward equalizer means; and
  feedback filter means for filtering an output of said decision means,
    wherein said decision means is responsive to said feedback filter means.

68. An Ethernet transceiver, comprising:

input means for receiving an input signal;

feedforward equalizer means for feedforward equalizing by high-pass filtering the input signal received by said input means, wherein said feedforward equalizer means comprises a finite impulse response (FIR) filter means for filtering the input signal, and wherein said FIR filter means comprises M taps for filtering precursor intersymbol interference (ISI), one main tap and N taps for filtering postcursor ISI;

an adaptive control means for adapting the M taps for filtering the precursor ISI and N taps for filtering the postcursor ISI; and decision feedback equalizer means comprising:
  decision means for recovering data from an output of said feedforward equalizer means; and
  feedback filter means for filtering an output of said decision means,
    wherein said decision means is responsive to said feedback filter means.

69. An Ethernet transceiver according to claim 68, wherein each of the N taps comprises a limiting means for limiting the range of adaptation of the N taps.

70. An Ethernet transceiver according to claim 68, wherein said adaptive control means is operable only during signal acquisition.

* * * * *